United States Patent [19]
Siegel

[11] Patent Number: 5,988,997
[45] Date of Patent: Nov. 23, 1999

[54] PISTON PUMP HAVING A HARDENED PISTON WITH A WAVY PROFILE

[75] Inventor: Heinz Siegel, Stuttgart, Germany

[73] Assignee: Robert Bosch GmbH, Stuttgart, Germany

[21] Appl. No.: 08/948,463

[22] Filed: Oct. 10, 1997

[30] Foreign Application Priority Data

Oct. 10, 1996 [DE] Germany .......................... 196 41 778

[51] Int. Cl.⁶ .................................................. F04B 39/10
[52] U.S. Cl. ........................... 417/554; 417/549; 92/159; 92/172
[58] Field of Search .................... 417/545, 549, 417/554; 92/159, 172

[56] References Cited

U.S. PATENT DOCUMENTS

| | | | |
|---|---|---|---|
| 2,895,773 | 7/1959 | McConnaughey | 92/245 |
| 3,792,518 | 2/1974 | Cross et al. | 29/156.4 |
| 4,075,934 | 2/1978 | Wacker et al. | 92/159 |
| 5,395,219 | 3/1995 | Hosoya et al. | 417/454 |
| 5,628,625 | 5/1997 | Dokas | 417/523 |

FOREIGN PATENT DOCUMENTS

| | | |
|---|---|---|
| 0 214 685 A1 | 8/1986 | European Pat. Off. . |
| 29 21 033 | 12/1979 | Germany . |
| 31 45 494 A1 | 5/1983 | Germany . |
| 33 15 050 A1 | 11/1983 | Germany . |
| 38 04 424 C1 | 8/1989 | Germany . |
| 1 200 453 | 7/1970 | United Kingdom . |
| WO 95/16859 | 6/1995 | WIPO . |

OTHER PUBLICATIONS

Karl Schimidt GmbH, SCH. 5976/46c/ dated 2/27/51.

*Primary Examiner*—Charles G. Freay
*Assistant Examiner*—David J. Torrente
*Attorney, Agent, or Firm*—Edwin E. Greigg; Ronald E. Greigg

[57] ABSTRACT

A piston pump for delivering hydraulic fluid for ABS brake systems having at least one pump piston. The pump piston is driven to execute an axial stroke motion and which, with a sliding face embodied on its circumference, slides against the inner wall of a guide bore in order to assure a favorable sliding friction between the pump piston and the guide bore for the purpose of noise reduction and to achieve longer service lives for the seal. Viewed in the longitudinal section of the pump piston, the slide face is embodied as wavy, wherein wave crests and wave troughs follow one another in succession in the longitudinal direction of the pump piston.

16 Claims, 1 Drawing Sheet

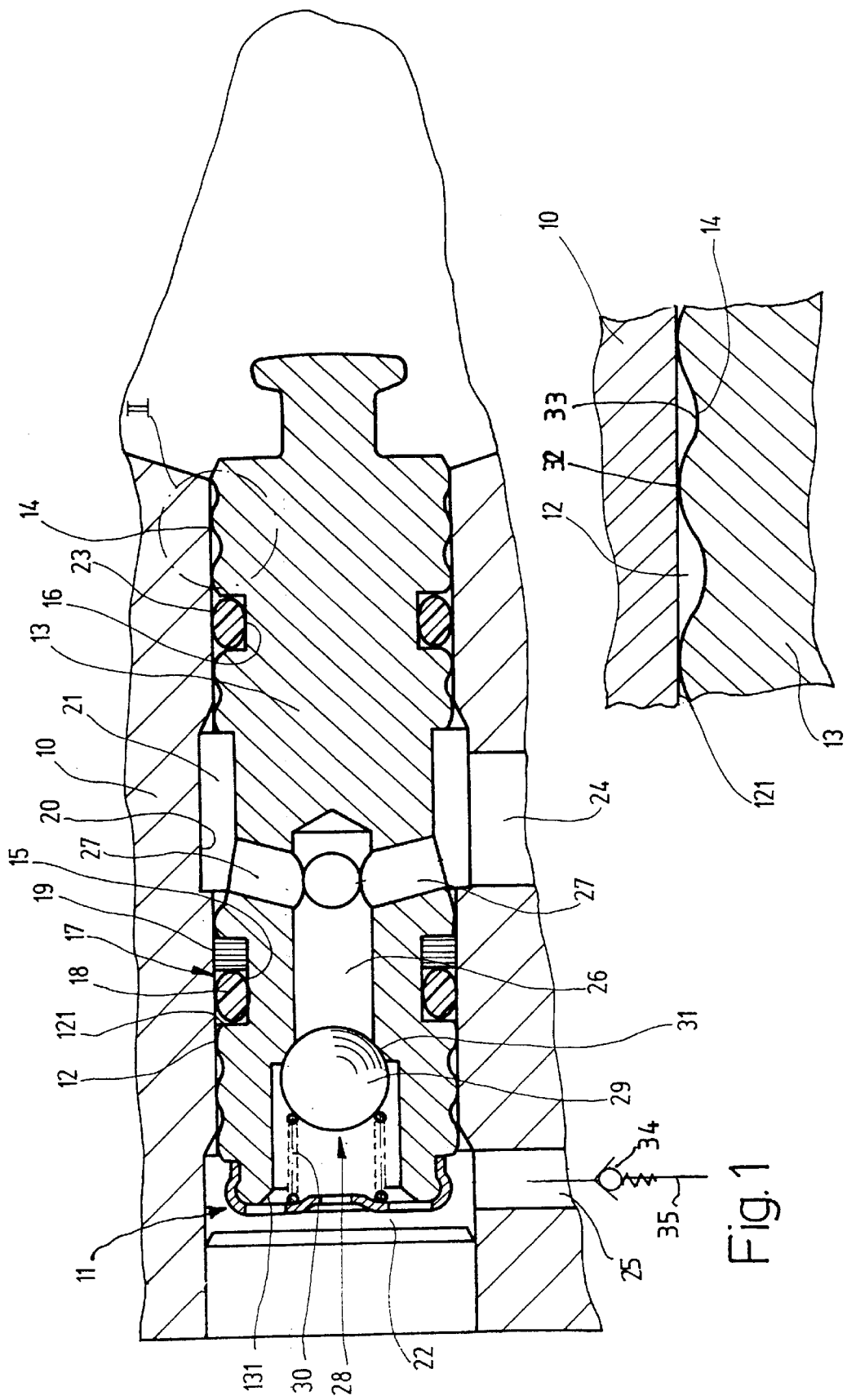

PISTON PUMP HAVING A HARDENED PISTON WITH A WAVY PROFILE

BACKGROUND OF THE INVENTION

The invention relates to a piston pump for delivering hydraulic fluid for motor vehicle brake systems with an antilocking device.

In a known piston pump of this type (WO 95/168859 A1), to reduce manufacturing costs, the guide bore for the pump piston is embodied directly in the pump body, i.e. without the use of a separate pump cylinder inserted into the pump body for the sliding guidance of the pump piston. To seal the pump piston in relation to the inner wall of the guide bore, a high pressure seal is provided, embodied as an annular seal comprised of polytetrafluoroethylene (PTFE), which is received on a step of the pump piston and in the axial direction, rests against the radial shoulder of the step. The omission of the pump cylinder that acts as a slide bush makes it necessary to take steps to prevent a damage or intense abrasion of the slide bush against the pump piston and of the sealing face against the annular seal in the longer term, particularly when the pump body is made out of aluminum in order to reduce costs. A measure of this kind, for example, is the anodization of the pump body.

OBJECT AND SUMMARY OF THE INVENTION

The piston pump according to the invention has the advantage over the prior art that the pump body comprised of aluminum does not have to be additionally machined. By means of the wavy profile on the surface of the pump piston, its circumferential, narrow contact regions that touch the inner wall of the guide bore are ball-shaped, that is, they have no edges. These ball-shaped contact regions function like a calibration tool in a smoothing fashion on the inner wall of the guide bore so that the inner wall, which also represents a sliding face for a seal possibly carried by the pump piston, is constantly smoothed, by means of which the service life of the seal is considerably increased. By means of the minimal, ball-shaped contact regions between the inner wall of the guide bore and the surface of the pump piston and by means of the wave troughs disposed between them, a very good lubricating action is produced by means of the supplied hydraulic fluid. The wavy profile according to the invention can be produced very precisely in diameter by means of plunge-cut grinding, wherein at the same time, the surface of the pump piston also becomes very smooth.

Advantageous improvements and updates of the piston pump are possible by means of the measures set forth herein.

According to a preferred embodiment of the invention, the material of the wavy sliding face of the pump piston has a significantly greater hardness than the material for the guide bore, which can, for example, be realized by virtue of the fact that the pump piston is made of hardened steel or only the wavy sliding face is hardened, e.g. by means of nitrifying, nitrocarbonizing, surface hardening, or the like.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 shows a detail from a longitudinal section through a piston pump for a motor vehicle brake system with an antilocking device, and FIG. 2 shows an enlarged representation of the detail II in FIG. 1.

DESCRIPTION OF THE PREFERRED EMBODIMENTS

The piston pump, which FIG. 1 shows in a detail from a longitudinal section, serves to deliver hydraulic fluid in a vehicle brake system that has an antilocking device, a so-called ABS brake system. It has a pump body 10 comprised of a light metal or light metal alloy, in which a pump chamber 11 is embodied with a guide bore 12 for a pump piston 13. Aluminum or an aluminum alloy is preferably used as a material for the pump body 10. Normally, there are a number of pump chambers in the pump body 10 and they have guide bores, each for a pump piston, but these pump chambers are not shown for the sake of clarity. The pump piston 13, which is driven to execute a reciprocating stroke motion by means of a drive not shown here, slides with a sliding face 14 embodied on its circumference against the inner wall 121 of the guide bore 12.

The pump piston 13 has two annular grooves 15 and 16 disposed spaced axially apart from each other. A high pressure seal 17, which is comprised of an annular elastomer seal 18 and a support ring 19, is inserted into the annular groove 15. The high pressure seal 17 divides the pump chamber 11 in the region of the guide bore 12 into a pump chamber 21 and a pump chamber 22 with respectively variable chamber volumes. For the embodiment of the pump chamber 21 that encompasses the pump piston 13 in an annular fashion, either an annular groove 20 is cut into the guide bore 12 or the diameter of the pump piston 13 is reduced in the section between the two annular grooves 15, 16. In the exemplary embodiment of the piston pump shown in FIG. 1, both are embodied. The pump chamber 21 that acts as a suction chamber is sealed by a sealing ring 23 inserted into the annular groove 16 in the pump piston 13 and communicates with a pump inlet via an intake conduit 24. The pump chamber 22, which acts as a pressure chamber and is defined by the end face 131 of the pump piston 13, communicates with the pump outlet 35 by means of a pressure conduit 25, wherein a check valve 34, which FIG. 1 shows in symbolic form, is additionally associated with the pressure conduit 25. The check valve 34 serves as a pump outlet valve and permits a flow of fluid from the pump chamber 22 to the pump outlet 35, but stops it in the opposite direction.

A central blind bore 26 that leads from the end face 131 is disposed in the pump piston 13, and at least one radial bore 27, which feeds into the blind bore 26, is disposed in the region of the annular groove 20. By means of the blind bore 26 and the radial bores 27, a connection is produced between the two pump chambers 21, 22 and this connection can be closed by means of a check valve 28. The check valve 28 serves as a pump inlet valve and is embodied in a known manner by a valve ball 29, which the force of a valve closing spring 30 presses against a valve seat 31 embodied circumferentially on the mouth of the blind bore 26. During a stroke motion of the pump piston 13, the check valve 28 permits a flow of fluid from the intake conduit 24 or from the pump chamber 21 into the pump chamber 22 or to the pressure conduit 25. During the return motion of the pump piston 13, the check valve 28 prevents a return flow of the fluid from the pump chamber 22 back into the pump chamber 21 and force the fluid through the outlet 25.

As can be seen in the enlarged representation of a detail of the pump piston 13 in FIG. 2, the sliding face 14 on the circumference of the pump piston 13—viewed in the longitudinal section of the pump piston 13—is embodied as wavy, wherein the wave crests 32 and wave troughs 33 follow one after the other in the axial direction of the pump piston 13. The wave crests 32 and wave troughs 33 have identical curvature radii. By means of this wavy embodiment of the sliding face 14, the pump piston 13 only contacts the inner wall 121 of the guide bore 12 with minimal, ball-shaped contact faces that extend in annular fashion circumferentially around the pump piston 13, while the wave troughs 33 are filled with hydraulic fluid. With the stroke motion of the pump piston 13, these ball-shaped contact regions function like a calibration tool and continuously smooth the inner wall 121 of the guide bore 12 so that by means of the extremely smooth sliding faces between the pump piston 13 and the pump body 10, only slight friction energy is produced and the pump piston 13 runs smoothly and quietly. Because of the constant smoothing of the inner wall 121 of the guide bore 12, the service lives of the high pressure seal 17 and the sealing ring 23 that serves as the low pressure seal are significantly lengthened.

For this smoothing function of the ball-shaped regions in the wave profile of the sliding face 14, it is necessary that the wavy sliding face 14 has a significantly greater hardness than the inner wall 121 of the guide bore 12. This is produced by virtue of the fact that either the pump piston 13 is made of hardened steel or only the wavy sliding face 14 is hardened. This kind of hardening of the sliding face 14 can, for example, be carried out by means of nitrifying, nitrocarbonizing, surface hardening, depositing of galvanic layers, and the like.

The invention is not limited to the above-described exemplary embodiment. Consequently, the guide bore 12 does not have to be embodied directly in the pump body 10, but can also be realized by means of a sleeve-shaped pump cylinder that is inserted into a corresponding recess in the pump body 10, but the omission of this pump cylinder permits manufacturing costs to be reduced.

Furthermore, a narrow gap seal can be provided between the pump piston 13 and the inner wall 121 of the guide bore 12 so that it is possible to omit the high pressure seal 17 and/or the low pressure seal, which is embodied as a simple sealing ring 23.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A piston pump for delivering hydraulic fluid for motor vehicle brake systems with an antilocking device, which comprises at least one pump piston (13) that is driven into an axial stroke motion and slides with a sliding face (14) embodied on the pump piston circumference against an inner wall (121) of a guide bore (12), in a longitudinal section of the pump piston (13), the sliding face (14) is embodied as wavy, wherein wave crests (32) and wave troughs (33) that preferably have identical curvature radii follow one another in succession in the longitudinal of the pump piston (13), and a material of the wavy sliding face (14) has a significantly greater hardness than a material of the inner wall (121) of the guide bore (12).

2. The piston pump according to claim 1, in which the pump piston (13) is made of hardened steel.

3. A piston pump according to claim 1, in which the guide bore (12) is incorporated directly into a pump body (10) itself, which has a pump inlet and pump outlet.

4. A piston pump according to claim 2, in which the guide bore (12) is incorporated directly into a pump body (10) itself, which has a pump inlet and pump outlet.

5. A piston pump according to claim 1, in which the guide bore (12) is embodied by a sleeve that is inserted into a pump body that has a pump inlet and pump outlet.

6. A piston pump according to claim 2, in which the guide bore (12) is embodied by a sleeve that is inserted into a pump body that has a pump inlet and pump outlet.

7. A piston pump according to claim 3, in which the pump body (10) is made of light metal or a light metal alloy.

8. A piston pump according to claim 4, in which the pump body (10) is made of light metal or a light metal alloy.

9. A piston pump according to claim 1, in which at least one annular seal (17, 23), which presses against the inner wall (121) of the guide bore (12), rests on the circumference of the pump piston (13).

10. A piston pump according to claim 3, in which at least one annular seal (17, 23), which presses against the inner wall (121) of the guide bore (12), rests on the circumference of the pump piston (13).

11. A piston pump according to claim 1, in which the pump piston (13), together with the guide bore (12), encloses a suction chamber (21), which encompasses said piston in annular fashion and communicates with a pump inlet, and encloses a pressure chamber (22) defined by an end face (121), which pressure chamber communicates with a pump outlet, and that the pump piston (13) has a bore (26, 27) that connects the suction chamber (21) to the pressure chamber (22) to each other and is closed by a check valve (28).

12. A piston pump according to claim 2, in which the pump piston (13), together with the guide bore (12), encloses a suction chamber (21), which encompasses said piston in annular fashion and communicates with a pump inlet, and encloses a pressure chamber (22) defined by an end face (121), which pressure chamber communicates with a pump outlet, and that the pump piston (13) has a bore (26, 27) that connects the suction chamber (21) to the pressure chamber (22) to each other and is closed by a check valve (28).

13. A piston pump for delivering hydraulic fluid for motor vehicle brake systems with an antilocking device, which comprises at least one pump piston (13) that is driven into an axial stroke motion and slides with a sliding face (14) embodied on the pump piston circumference against an inner wall (121) of a guide bore (12), in a longitudinal section of the pump piston (13), the sliding face (14) is embodied as wavy, wherein wave crests (32) and wave troughs (33) that preferably have identical curvature radii follow one another in succession in the longitudinal direction of the pump piston (13), and the wavy sliding face (14) is hardened to a hardness greater than said inner wall of the guide bore.

14. A piston pump according to claim 13, in which the guide bore (12) is incorporated directly into a pump body (10) itself, which has a pump inlet and pump outlet.

15. A piston pump according to claim 13, in which the guide bore (12) is embodied by a sleeve that is inserted into a pump body that has a pump inlet and pump outlet.

16. A piston pump according to claim 13, in which the pump piston (13), together with the guide bore (12), encloses a suction chamber (21), which encompasses said piston in annular fashion and communicates with a pump inlet, and encloses a pressure chamber (22) defined by an end face (121), which pressure chamber communicates with a pump outlet, and that the pump piston (13) has a bore (26, 27) that connects the suction chamber (21) to the pressure chamber (22) to each other and is closed by a check valve (28).

* * * * *